US012701108B2

(12) United States Patent
Tarasov

(10) Patent No.: US 12,701,108 B2
(45) Date of Patent: Aug. 4, 2026

(54) ONE TIME PAD KEY EXCHANGE

(71) Applicant: Charter Communications Operating, LLC, St. Louis, MO (US)

(72) Inventor: Alex Tarasov, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 33 days.

(21) Appl. No.: 18/885,205

(22) Filed: Sep. 13, 2024

(65) Prior Publication Data

US 2026/0081901 A1 Mar. 19, 2026

(51) Int. Cl.
*H04L 9/40* (2022.01)
*H04L 9/32* (2006.01)

(52) U.S. Cl.
CPC .......... *H04L 63/061* (2013.01); *H04L 9/3228* (2013.01); *H04L 2209/50* (2013.01)

(58) Field of Classification Search
CPC .. H04L 63/061; H04L 9/3228; H04L 2209/50
See application file for complete search history.

(56) References Cited

U.S. PATENT DOCUMENTS

| | | | |
|---|---|---|---|
| 9,584,323 B2 | 2/2017 | Hazay et al. | |
| 2003/0149869 A1* | 8/2003 | Gleichauf | H04L 45/50 |
| | | | 713/153 |
| 2007/0070762 A1* | 3/2007 | Wu | G11B 20/10527 |

| | | | |
|---|---|---|---|
| 2012/0321318 A1* | 12/2012 | Xu | H04L 27/2642 |
| | | | 398/76 |
| 2013/0138961 A1* | 5/2013 | Tsuji | H04L 9/0816 |
| | | | 713/171 |
| 2015/0082020 A1* | 3/2015 | Thompson | H04L 9/0656 |
| | | | 713/150 |
| 2015/0304104 A9* | 10/2015 | Hammersmith | H04L 9/0819 |
| | | | 380/46 |
| 2021/0250339 A1* | 8/2021 | Chumura | H04L 9/14 |
| 2024/0161104 A1* | 5/2024 | Underhill | G06Q 20/3829 |

OTHER PUBLICATIONS

Kumar, R., Jindal, R., Gupta, A., Bhalla, S. and Arora, H., "A secure authentication system-using enhanced one time pad technique," International Journal of Computer Science and Network Security, IJCSNS, 11(2), 2011, pp. 11-17. (Year: 2011).*
P.-Y. Kong and Y. Wang, "Unmanned Aerial Vehicle as Encryption Key Distributor for Secure Communications in Smart Grid," in IEEE Internet of Things Journal, vol. 10, No. 8, pp. 6849-6858, Apr. 15, 2023, doi: 10.1109/JIOT.2022.3227297. (Year: 2023).*
Transmission Control Protocol—Wikipedia, 23 pages downloaded Sep. 13, 2024 from https://en.wikipedia.org/wiki/Transmission_Control_Protocol.
Reliability (computer networking)—Wikipedia, 6 pages downloaded Sep. 3, 2024 from https://en.wikipedia.org/wiki/Reliability_(computer_networking).

(Continued)

*Primary Examiner* — Robert B Leung
(74) *Attorney, Agent, or Firm* — Otterstedt & Kammer PLLC

(57) ABSTRACT

Background-share a one-time pad key from a first location to a second location over a secure background channel. Send a message, encrypted with the one-time pad key, from the first location to the second location, over an unsecure channel.

21 Claims, 3 Drawing Sheets

(56) References Cited

OTHER PUBLICATIONS

One-time pad—Wikipedia, 16 pages downloaded Sep. 13, 2024 from https://en.wikipedia.org/wiki/One-time_pad.

Edward Robin, Jun. 29, 2023, If you had to both encrypt and compress data during transmission, which would you do first and why?, 13 pages downloaded May 29, 2024 from https://www.newsoftwares.net/blog/if-you-had-to-both-encrypt-and-compress-data-during-transmission/.

R/cryptography, one time pad question, 7 pages downloaded May 29, 2024 from https://www.reddit.com/r/cryptography/comments/c7n112/one_time_pad_question/.

Johnson, Mark, David Wagner, and Kannan Ramchandran. "On compressing encrypted data without the encryption key." Theory of Cryptography: First Theory of Cryptography Conference, TCC 2004, Cambridge, MA, USA, Feb. 19-21, 2004. Proceedings 1. Springer Berlin Heidelberg, 2004. 14 pages.

Amy Larsen DeCarlo, What's the difference between network reliability and availability?, Apr. 3, 2023, 6 pages downloaded Sep. 3, 2024 from https://www.techtarget.com/searchnetworking/answer/Whats-the-difference-between-network-availability-and-reliability.

Nagaraj, Nithin, Vivek Vaidya, and Prabhakar G. Vaidya. "Revisiting the One-Time Pad." arXiv preprint cs/0508079 (2005). 13 pages from http://arxiv.org/abs/cs/0508079v1 Aug. 18, 2005.

Al-Smadi, Ahmad Mohamad, et al. "Files cryptography based on one-time pad algorithm." International Journal of Electrical and Computer Engineering (IJECE) 11 (2021). International Journal of Electrical and Computer Engineering (IJECE) vol. 11, No. 3, Jun. 2021, pp. 2335~2342.

* cited by examiner

ONE TIME PAD KEY EXCHANGE

FIELD OF THE INVENTION

The present invention relates generally to the electrical, electronic and computer arts, and, more particularly, to communications networks and encryption techniques.

BACKGROUND OF THE INVENTION

The effectiveness of encryption algorithms typically depends on the difficulty of decryption, but very few of the conventional encryption algorithms have been proven to be impossible to decrypt. One algorithm that has been proven to be impossible to decrypt is the one time pad (OTP) algorithm, which is impossible for an adversary to decrypt regardless of the adversary's computing power. This is especially relevant with the rise of quantum computing and the attendant risk of defeating the protections offered by encryption. The one time pad algorithm, however, is frequently criticized because the size of the key must always be larger than the data being encrypted.

SUMMARY OF THE INVENTION

Principles of the invention provide one time constant key encryption for one time pad key exchange. In one aspect, an exemplary computer-implemented method includes the operations of background-sharing a one-time pad key from a first location to a second location over a secure background channel; and sending a message, encrypted with the one-time pad key, from the first location to the second location, over an unsecure channel.

In another aspect, a non-transitory computer readable medium includes computer executable instructions which when executed by a computer cause the computer to perform the method of: background-sharing a one-time pad key from a first location to a second location over a secure background channel; and sending a message, encrypted with the one-time pad key, from the first location to the second location, over an unsecure channel.

In still another aspect, an exemplary system includes a first client; the first client in turn includes a first memory; and at least one first processor, coupled to the first memory, and operative to: background-share a one-time pad key from the first client to a second client over a secure background channel; and send a message, encrypted with the one-time pad key, from the first client to the second client, over an unsecure channel.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a non-transitory machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps (or a system wherein one or more such apparatuses are networked together, optionally with one or more other components). Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

improve the technological process of OTP key exchange, which requires secure exchange of a key greater than the size of the message, by background-sending the key over a relatively slow but secure connection so that it is available when secure communication is needed;

data encryption techniques that are secure even against the relatively infinite resources of quantum computing; and hybrid compression-encryption techniques that address the shortcomings of the one-time pad encryption algorithm.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
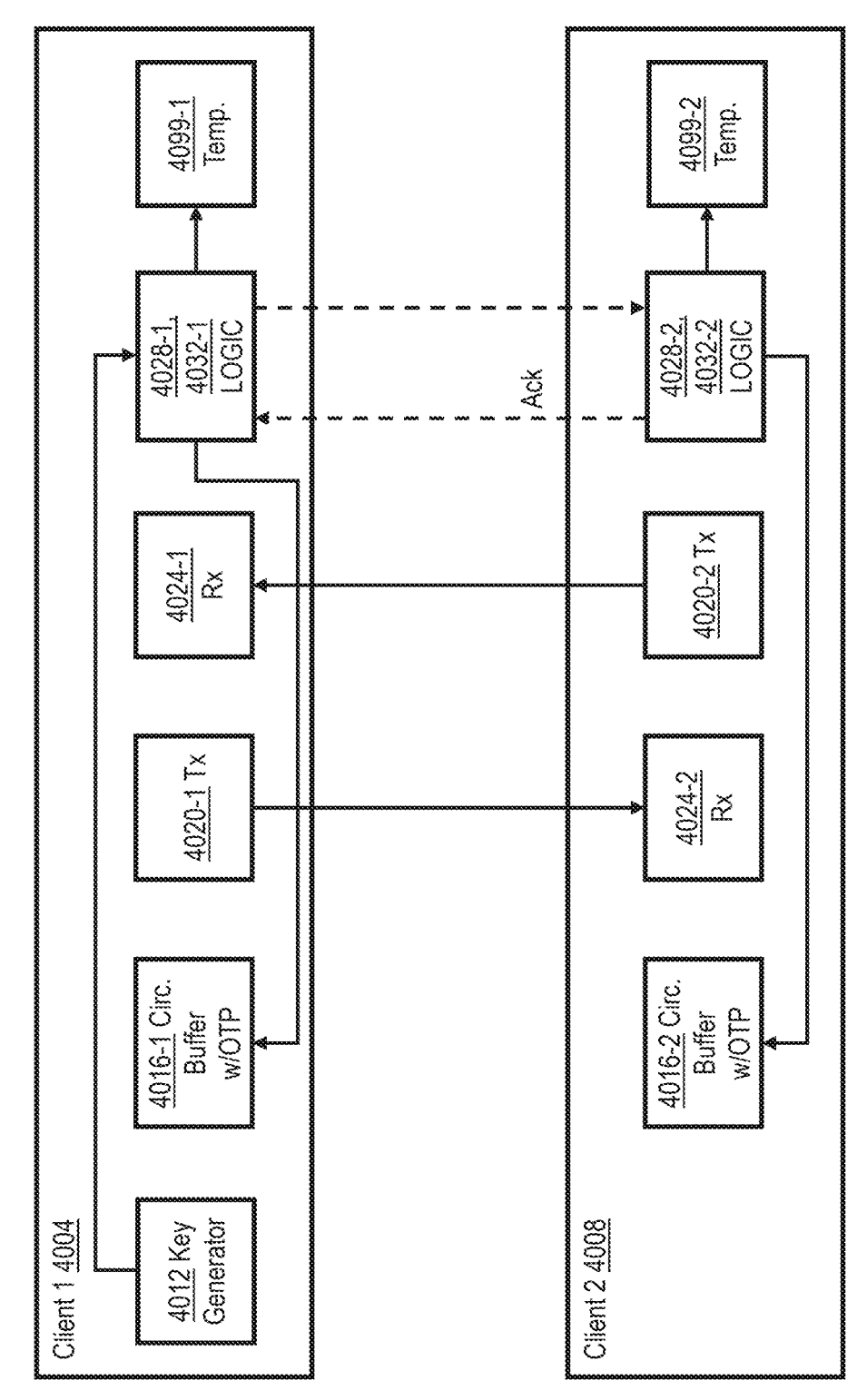
FIG. 1 is a block diagram of an example system for transferring data using a one-time pad algorithm, in accordance with example embodiments.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present disclosure will be described herein in the context of techniques for one time pad key exchange. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Generally, techniques are provided for encrypting network communications using one-time pad encryption. Exchanging the key for a one-time pad algorithm is a well-known challenge preventing the adoption of the one-time pad algorithm. With the rise of quantum computing, an increasing number of encryption algorithms may be broken, but not the one-time pad algorithm. One or more embodiments advantageously overcome the prior-art challenges of key exchange for the one-time pad algorithm, allowing the use of the one-time pad algorithm for highly sensitive applications where risks to data security cannot be taken.

Consider instances where two entities (e.g., buildings/agencies/people) that need to communicate with each other have a communication link that, while secure, does not lend itself well to real-time communication due to high latency, low bandwidth, and the like. To overcome this, in one or more embodiments, "chunks" of a one-time pad can be sent over the secure link to fill a circular buffer containing the key of the one-time pad algorithm. The circular buffer can then be utilized (depleted) to decrypt data transferred over a faster and/or lower latency (yet potentially unsecure) communication link. This essentially creates a fast and/or low latency communication link that is also secure. A limitation is that the data cannot be decrypted while the buffer is depleted, meaning that bursts of information are supported up to the size of the buffer (depending on the latency of refilling the circular buffer). It is worth noting that the data can be transferred before, during, or in parallel with the transfer of the key. If the buffer is in the depleted state, and data is being sent anyway in advance, the system then waits for the key to be sent so that the data can be decrypted later. However, it would make more sense to simply send the data over the slow/secure link under such conditions (this is a fallback mechanism in some cases if the buffer is depleted). Thus, while it is possible to send data when the buffer is depleted, this defeats one purpose of some aspects of the invention and the user would likely be better off just sending the data over the slow/secure link.

In one or more exemplary embodiments, no human intervention in the exchange of the one-time pad keys is needed; the exchange is automated to reduce required resources, increase data transfer rates, and/or to increase adoption of the one-time pad algorithm. One or more embodiments thus provide one-time pad constant key exchange over a relatively slow and secure network to enable secure transmission bursts over a relatively fast and unsecure network. Furthermore in this regard, a pertinent characteristic of the secure network is its security so that the one-time pad key can be safely sent. The secure network may or may not be "slow" and may or may not be reliable. However, aspects of the invention (background sharing) can be advantageously employed when the secure network is too slow and/or unreliable to be conveniently used for sending the message per se. As will be appreciated by the skilled artisan, in computer networking, a reliable protocol is a communication protocol that notifies the sender whether or not the delivery of data to intended recipients was successful. Reliability of a network is the measure of the length of time infrastructure operates without disruption. The secure network may or may not be reliable. A reliable protocol such as the Transmission Control Protocol (TCP) can be used even when a network has poor reliability.

As noted, the one-time pad algorithm is frequently criticized because the size of the key must always be larger than the data it is encrypting. To overcome this limitation, in some exemplary embodiments, compression can optionally be used to reduce the size of the data to be transferred prior to encryption. While the combination of compression and encryption is thought to be less secure for many conventional encryption algorithms, this is not the case for the one-time pad algorithm.

Return again to the exemplary scenario of communication between two entities. The two entities could have an interconnection (secure) via an existing infrastructure but it might be very slow/have a very high latency. If a conventional secure communication infrastructure does not exist between the entities, alternative (although less convenient) secure methods can be used, such as sending drones or the like between the entities. In any event, the secure communication can be background-performed based on demand, on a periodic (e.g., daily) basis, on a continuous basis, and the like, and can be background-performed in an automated way with no human intervention (other than maintenance). Free space optical communication and other methods that are physically hard to intercept when exchanging information could also be utilized in a secure way (e.g., armored buried cable, drone, unmanned ground vehicle, unmanned marine vehicle). In example embodiments, a circular buffer is configured to store the one-time pad, where the circular buffer is filled (either constantly or periodically) with new chunks of the OTP key via the secure communication mechanism.

Once the circular buffer is initialized, it can be utilized for encryption, and once transferred to the receiving entity (client, server, and the like), it can be utilized for decryption. The transfer of the encrypted data can be performed via an unsecure medium, such as a high speed, low latency channel. For example, unsecure fiber/cable/satellite communication channels can be utilized. This allows time-sensitive information to be delivered on time and with robust security that otherwise would not be possible. In one or more exemplary embodiments, no human intervention is needed to facilitate the key exchange.

In one non-limiting exemplary scenario, a one-time pad buffer on a ship is filled while the ship is docked at a home port. Once filled, the ship can then communicate securely via, for example, satellites using the one-time pad. Similar scenarios can be utilized for aircraft and the like. If the ship docks/aircraft lands before the buffer is depleted, in one or more embodiments, however many bytes are needed to fill it up again to the maximum will be added to the buffer. Generally, the buffer could be filled entirely, depleted while ship is voyaging/aircraft is flying and refilled completely or partially, partially depleted while voyaging/flying and partially or completely refilled. If the ship is only at the dock a short time or the aircraft is only on the ground for a short time, the system will, in one or more embodiments, just fill in whatever it can.

Optionally, data is compressed prior to encryption with the one time pad algorithm. Assume that a first user wants to send a message to a second user via a one-time pad that the users exchanged beforehand. Assume that the key (pad) is 1,000 bytes in length and that the first user has a file that has 1,100 bytes (and thus could not be sent via the key using the traditional algorithm, since the file is bigger than the key). The file, however, is a simple text document that compresses well. The file is thus first compressed to 700 bytes and the one-time pad is applied to the compressed file by XORing the first 700 bytes of the one-time pad with the file. The result is a seemingly random set of bits that the first user sends to the second user. The second user then decrypts the file by XORing the first 700 bytes of the second user's copy of the one-time pad with the received data. The result is then decompressed to derive the original 1,100 byte text file. After the transmission, the users have 300 bytes available in the one-time pad to exchange further information.

In summary, it is optionally possible to send data, such as text, of a size greater than the key size of the one-time pad algorithm by using compression. This method will not compromise the security of the one-time pad algorithm because XORing a truly random key with any data (even compressed data) will produce random data and, unless the key is known to an adversary, the encryption process is safe from attackers, even if such attackers have infinite computing power.

FIG. 1 is a block diagram of an exemplary system 4000 for transferring data using a one-time pad algorithm, in accordance with aspects of the invention. A first client 4004 is configured to transfer data to a second client 4008. A circular buffer 4016-1 is configured to store the one time pad (also referred to as a key herein) in a circular manner; that is, a start index identifies the next bit(s) in the key to be used for encrypting the data and an end index identifies the last bit(s) of the key that were generated. (The circular buffer 4016-1 may be stored, for example, on a hard disk, in static (non-volatile) memory, and the like.) Once the circular buffer 4016-1 is filled, new bits of the key cannot be stored until at least one of the bits of the key is removed and/or utilized to encrypt data.

The key in the circular buffer 4016-1 is transferred to the second client 4008 to enable the second client 4008 to decrypt a received message. In one or more embodiments, the key is transferred via a secure link, where the secure link can be relatively high latency/low bandwidth but secure, providing flexibility in transferring the key to another machine such as client 4008. While the system could work with fast secure exchange of the key, if a fast secure link was available that could just be used to send the message so there would be no point to the using aspects of the invention. In FIG. 1, communications between clients 4004, 4008 over the secure link are in dashed lines while communications between clients 4004, 4008 over the faster and/or lower latency (yet potentially unsecure) communication link are in solid lines.

In one or more embodiments, logic 4032-1 on client 4004 carries out encryption by XOR-ing bits of the message with bits of the OTP and logic 4032-2 on client 4008 carried out decryption by XOR-ing bits of the message with bits of the OTP, as described elsewhere herein.

A key generator 4012 generates N truly random numbers and inserts them into the end of the circular buffer 4016-1 using the end index while the circular buffer 4016-1 is not full. This aspect can be implemented, for example, by logic 4028-1 on client 4004 as discussed further below. In example embodiments, the key generator 4012 is implemented in hardware; bits are removed from the buffer from the start/left, and newly generated random bits are inserted at the end/right of the buffer. A predetermined number of entries can be maintained in the circular buffer, for example, with continual discarding and adding. In example embodiments, a portion of the key is transferred, prior to the generation of the entire key. That is to say, one or more embodiments transfer the key in "chunks" due to use of the secure connection; there is no point to wait until the whole key is ready to send it. It is worth noting that one or more embodiments intend for the key to have no end; while it can be appended to indefinitely, the continuous key generation stops once the buffer is full. One or more embodiments can be thought of as a never ending stream of key bits—as the buffer is depleted it is constantly replenished. The key is sent over to client 2. Only as much as is needed to handle a certain message is taken out of the buffer. In one or more embodiments, the buffer will be large enough to handle any message size believed likely.

Further regarding buffer size, in one or more embodiments, "the bigger the better" because then multiple messages that the user is seeking to transmit can be handled. For example, the buffer could be filled up with a key corresponding to a week's worth of the slow connection and it might not be needed but it is available if needed. In one or more embodiments, there is a start to the key when the system is set up but there is no end in a theoretical sense as the system continues in use. In this aspect, the buffer is just a window of the infinitely long key—the buffer just keeps replenishing.

As noted above, in one or more embodiments, the key is transferred via a secure mechanism, such as a secure communication link. Other secure transfer mechanisms can be utilized, including transfer via a drone (e.g., flying between two buildings, a ship and a port, etc.) and the like. The transfer can be performed periodically (such as daily), on demand, and the like, but in one or more embodiments is performed in the background in an automated manner so that the key is ready when a message must be sent. In example embodiments, acknowledgements are exchanged between the clients 4004, 4008 to ensure that the circular buffers 4016-1, 4016-2 are synchronized ("in sync") prior to decryption of the data. That is to say, the N generated random bits are sent to circular buffer 4016-2, and if sent successfully (as confirmed by ACK), added to the end of buffer 4016-1; the acknowledgements from client 2 confirm the successful sending. Thus, one or more embodiments include key generator 4012, which generates a certain number of bits that are sent to client 2. If client 2 successfully receives bits, client 2 "acks" back to logic 4028-1 in client 4004 and when logic 4028-1 receives the "ack," the bits are also placed into the buffer 4016-1 in client 1. In one or more embodiments, the N generated random bits are stored in temporary storage 4099-1 (any kind of data structure in volatile or non-volatile memory) until the ACK is received and then stored in buffer 4016-1. Further, logic 4028-2 on client 4008 can generate the ACK.

After generation of the key, the data to be securely transferred is encrypted. Each bit of the key is XORed with a bit of the data to be transferred in a prescribed order. For example, the bit in the key identified by the start index is XORed with the next unencrypted bit of the data to be transferred. In example embodiments, a plurality of bits of the key are XORed, in parallel, with a plurality of bits of the data to be transferred. For example, the start index may identify m bits of the key that are to be XORed with the next m bits of the data to be transferred. Once encrypted, the data to be securely transferred is transmitted via transmitter 4020-1 to a receiver 4024-2 of the client 4008. The transmission is performed, for example, via satellite, another wireless technology, and the like. The data can be transmitted on-the-fly (after only a portion of the data has been encrypted) or after all of the data to be transferred has been encrypted, for example. As will be appreciated by the skilled artisan, the one-time pad is a stream cipher, so that the data can be encrypted little by little in chunks of any size and transmitted before encrypting the whole message.

The data is received by client 4008 via receiver 4024-2, and decrypted using circular buffer 4016-2. If the data was compressed prior to encryption, it is decompressed to generate the original data after decryption. It is noted that encrypted data, acknowledgements, and the like can be transferred from the client 4008 to the client 4004 using transmitter 4020-2 and receiver 4024-1. Note that the clients 4004, 4008 can include separate transmitters and receivers, unitary transceivers, network interface cards (NICs), antennas, and the like for the fast unsecure connection. Depending on the nature of the slow but secure connection, the same could also have separate transmitters and receivers, unitary transceivers, network interface cards (NICs), antennas, and the like (omitted to avoid clutter).

In one or more embodiments, removing bits from the buffer, adding bits to the buffer, and carrying out the XOR operation can be implemented in software (e.g., assembly language for XOR; comparison and WRITE statements in a high-level language that is subsequently compiled).

Figure 2:
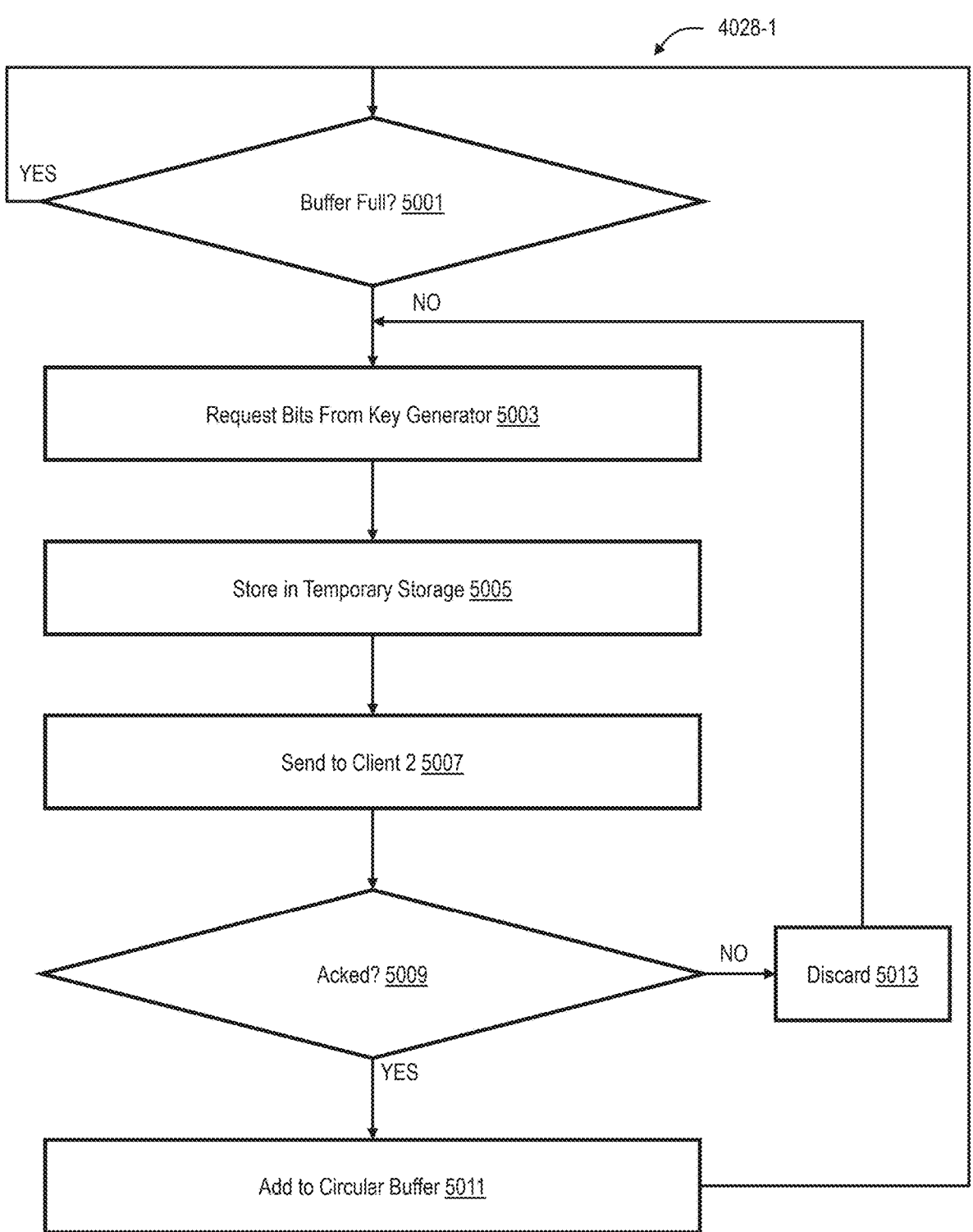
FIG. 2 is a flow chart depicting logic implemented by the first client in FIG. 1, in accordance with example embodiments.

FIG. 2 shows a flow chart for implementing logic 4028-1. In decision block 5001, continuously check whether buffer 4016-1 is full. If yes, simply continue monitoring, periodically or continuously. If no, proceed to step 5003 and request bits from the key generator 4012. In step 5005, store the requested bits in temporary storage 4099-1. The bits are sent to the client 4008 in step 5007. In decision block 5009, determine whether the client 4008 has acknowledged receipt of the bits; if yes, add them to the circular buffer 4016-1 in step 5011 and go back to monitoring the buffer; else, discard them in step 5013 and again request bits from the key generator.

Given the discussion thus far, it will be appreciated that, in general terms, an exemplary computer-implemented method, according to an aspect of the invention, includes the steps of background-sharing a one-time pad key from a first location (e.g., client 4004) to a second location (e.g., client 4008) over a secure background channel (dashed connector). A further step includes sending a message, encrypted with the one-time pad key, from the first location (e.g., Tx 4020-1 of client 4004) to the second location (e.g., Rx 4024-2 of client 4008), over an unsecure channel (solid connector).

In one or more embodiments, in the steps of background sharing the one-time pad key and sending the message, the secure background communications channel is slower than the unsecure channel.

In some cases, in the step of background sharing the one-time pad key, the secure background communications channel includes at least one of a secure shielded cable; a scheduled drone, scheduled unmanned ground vehicle, or scheduled unmanned marine vehicle carrying memory media; and free space optical communication (e.g., a laser that turns on and off with a receiver at the other end, similar to a fiber optic cable but not captured in a waveguide, sent in free space, and highly directional so hard to intercept). The secure background communications channel should have the capability to provide an ACK.

In one or more embodiments, in the step of sending the message, the unsecure channel includes at least one of wired internet, wireless communications (including but not limited to wireless internet), and satellite.

Referring for example to FIG. 2, in some cases, background-sharing the one-time pad key includes: determining, with first logic at the first location, that a first circular buffer at the first location is not full (NO branch of decision block 5001); and responsive to determining that the first circular buffer is not full, storing a predetermined number of bits from a random number generator at the first location in temporary storage at the first location (step 5005); and sending the predetermined number of bits from the random number generator to the second location over the secure background channel (step 5007). The bits could be obtained, for example, responsive to the request 5003. A further step includes, upon receiving an acknowledgement of receipt from the second location over the secure background channel (YES branch of decision block 5009), storing the predetermined number of bits from the random number generator in the first circular buffer in step 5011.

One or more embodiments further include decrypting the message at the second location using the one-time pad key (e.g., XOR-ing with logic 4032-2). One or more such embodiments further include carrying out the steps described in the preceding paragraph as well as obtaining, at the second location, the predetermined number of bits from the random number generator at the first location over the secure background channel; at the second location, sending the acknowledgement of receipt to the first location over the secure background channel; and storing the predetermined number of bits from the random number generator at the first location in a second circular buffer 4016-2 at the second location.

As noted, one or more embodiments further include encrypting the message by XOR-ing bits from a start of the first circular buffer 4016-1 with bits of the message (e.g., using logic 4032-1).

In one or more embodiments, decrypting the message at the second location using the one-time pad key includes decrypting the message by XOR-ing corresponding bits from a start of the second circular buffer with corresponding bits of the message (e.g., using logic 4032-2).

As noted, it is possible to compress the message prior to encryption. Thus, one or more embodiments further include compressing the message to obtain a compressed message, where, in the step of sending the message, the compressed message is encrypted with the one-time pad key, and in the step of decrypting the message at the second location, the encrypted compressed message is decrypted; and still further include decompressing the decrypted compressed message.

It is worth reiterating that the dashed lines between the clients in FIG. 1 represent a secure but undesirable connection; while the solid lines between the clients represent an unsecure but good-performance connection. Client 1 4004 and Client 2 4008 can be similar in one or more embodiments (see FIG. 3 and discussion); and both can have circular buffers 4016-1 4016-2 respectively. In a non-limiting example, only Client 1 4004 has a key generator 4012. The key generator can be hardware that generates truly random numbers or can be a software-based approach using an algorithm (although this is less desirable, and truly random numbers are preferred).

In a non-limiting example, key generator 4012 is a hardware-based key generator interfaced to a computer implementing Client 1. Client 1 requests random bits from the generator 4012 and this can be a relatively slow process. In one or more embodiments, the circular buffer 4016-1 of Client 1 and the circular buffer 4016-2 on Client 2 are two different entities—each client has its own circular buffer. In one or more embodiments, both buffers are always trying to be synchronized using the slow secure channel. This process can be implemented with logic 4028-1 and 4028-2 on both clients.

As shown in FIG. 2, when Client 1 sees that the buffer is not full it knows it is responsible to generating more bits for use as an OTP. Logic 4028-1 asks key generator 4012 for one or more bits. These bits are stored in temporary location 4099-1 and are sent to Client 2 by the secure channel. Client 2 obtains the bits and stores them in its temporary location 4099-2 and sends an ack back to Client 1. Only when the ack gets back to client 1 do both clients commit those bits to the circular buffers 4016-1, 4016-2, making sure the buffers are "in synch." In one or more embodiments, this process continues until both circular buffers fill up. In one or more embodiments, Client 1 does most of the work using logic 4028-1 and Client 2 just sends the ack using logic 4028-2. That is to say, logic 4028-2 simply involves monitoring for receipt of bits from client 1, placing them in storage 4099-2, sending the ack, and storing the received bit in circular buffer 4016-2 when the ack is returned to Client 1. It is worth noting that one or more embodiments only need one ack, from the key receiver. If the sender sends a response, and an ack is not obtained for a sufficiently long time (as will be understood heuristically by the skilled artisan, given the application), assume the key was lost and retransmit it, as in the well-known TCP protocol. Thus, in a non-limiting example, the ACK implies that the scheme has a similar retry mechanism as does TCP, it being understood that other schemes could be employed in other embodiments.

When there is no more space in the buffer (YES branch of block 5001), Client 1 does not fill it anymore; it pauses. Once there is space again it generates more bits (NO branch of block 5001). The desirable connection with good performance (solid connectors) sends the actual message data. It works in a somewhat similar way to the secure connection but the logic is simpler. It is desired to send (message) bits from Client 1 to Client 2. Those bits are XOR-ed with a corresponding number of bits (say, 20 or other predetermined number) from the beginning of the circular buffer (which acts as a FIFO queue). Now the circular buffer is missing 20 bits/has 20 bits of free space. The key is not generated yet because the message has not been transmitted. When the message is sent to Client 2, Client 2 then takes its 20 bits (same as Client 1) and carries out the XOR to decrypt the message. Client 2 sends an ack back to Client 1 that it successfully decrypted the message, and now the key generation stage can happen again because at that point the buffers are in synch. The same logic happens if Client 2 sends a message to Client 1.

Logic 4032-1 and 4032-2 is logic, on Client 2 and Client 1, for encrypting/decrypting with the XOR-ing as discussed. It is desirable to always keep the buffers 4016-1, 4016-2 "in synch." It is desirable to ensure that when a message is sent, however many bits were taken from buffer 4016-1 to encrypt, the same number of bits are taken out of buffer 4016-2 to decrypt, so the buffers will be aligned when the next message is encrypted/decrypted. The one-time pad key is a "chunk" of the buffer 4016-1.

It is worth noting that in one or more embodiments, the whole OTP does not reside in either buffer; parts of the OTP that have been "consumed" are discarded.

In another aspect, a non-transitory computer readable medium includes computer executable instructions which when executed by a computer cause the computer to perform any one, some, or all of the method steps described herein; multiple such media can be used (for example, one for each client implementing the corresponding steps).

In still another aspect, an exemplary system includes a first client 4004. The client 4004 includes a first memory (represented by element 730); and at least one first processor (represented by element 720), coupled to the first memory, and operative to: background-share a one-time pad key from the first client to a second client over a secure background channel; and send a message, encrypted with the one-time pad key, from the first client to the second client, over an unsecure channel.

In one or more embodiments, the first client 4004 further includes a first circular buffer 4016-1, first temporary storage 4099-1, and a random number generator 4012 coupled to the at least one first processor. Furthermore, the at least one first processor implements first logic (e.g., 4028-1); and the at least one first processor background-shares the one-time pad key by: determining, with the first logic, that the first circular buffer is not full; responsive to determining that the first circular buffer is not full: storing a predetermined number of bits from the random number generator in the first temporary storage; and sending the predetermined number of bits from the random number generator to the second client over the secure background channel; and, upon receiving an acknowledgement of receipt from the second client over the secure background channel, storing the predetermined number of bits from the random number generator in the first circular buffer. See, e.g., FIG. 2.

In one or more embodiments, the system further includes the second client 4008; and a communications network that couples the first and second clients and implements the unsecure channel (solid connectors). The second client includes a second memory (also represented by element 730), and at least one second processor (also represented by element 720), coupled to the second memory, and operative to decrypt the message using the one-time pad key.

As noted, in one or more embodiments, the first client 4004 further includes a first circular buffer 4016-1, first temporary storage 4099-1, and a random number generator 4012 coupled to the at least one first processor. Furthermore, the at least one first processor implements first logic (e.g., 4028-1); and the at least one first processor background-shares the one-time pad key as set forth above. In addition, in some instances, the second client 4008 further includes second temporary storage 4099-2, and the at least one second processor is operative to: obtain the predetermined number of bits from the random number generator over the secure background channel; send the acknowledgement of receipt to the first location over the secure background channel; and store the predetermined number of bits from the random number generator in the second circular buffer.

As indicated, in one or more embodiments, the at least one first processor is operative to encrypt the message by XOR-ing bits from a start of the first circular buffer with bits of the message (e.g., logic 4032-1). As also indicated, in one or more embodiments, the at least one second processor is operative to decrypt the message by XOR-ing corresponding bits from a start of the second circular buffer with corresponding bits of the message (e.g., logic 4032-2).

In some cases, the at least one first processor is operative to compress the message to obtain a compressed message, where the compressed message is encrypted with the one-time pad key; and the at least one second processor is operative to decrypting the encrypted compressed message and to decompress the decrypted compressed message.

In one or more embodiments, the secure background communications channel is slower than the unsecure channel implemented on the communications network.

One or more embodiments further include at least one of a secure shielded cable; a scheduled drone, scheduled unmanned ground vehicle, or scheduled unmanned marine vehicle carrying memory media; and free space optical communication implementing the secure background communications channel between the first and second clients.

In one or more embodiments, the communications network that couples the first and second clients and implements the unsecure channel includes at least one of wired internet, wireless communications, and satellite.

SYSTEM AND ARTICLE OF MANUFACTURE DETAILS

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 3:
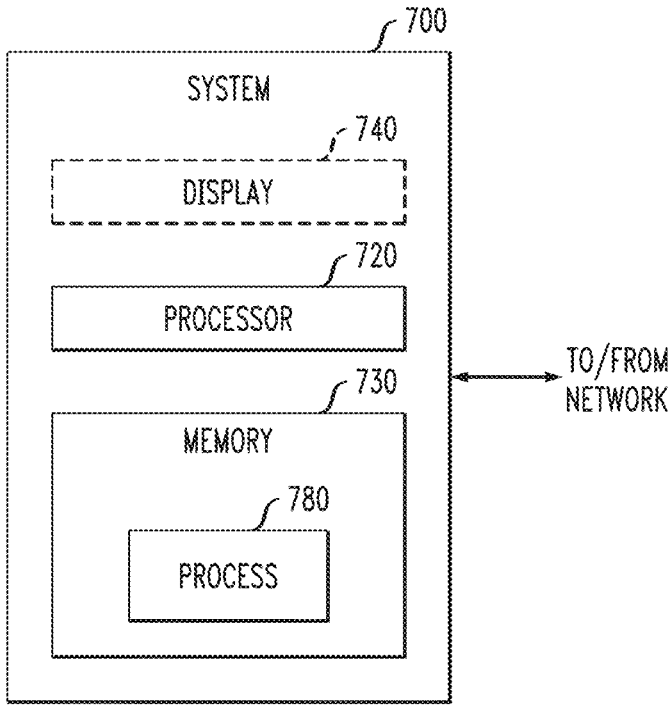
FIG. 3 is a block diagram of a computer system useful in connection with one or more aspects of the invention.

FIG. 3 is a block diagram of at least a portion of an exemplary system 700 that can be configured to implement at least some aspects of the invention, and is representative, for example, of one or more of the apparatuses, clients, servers, or modules shown in the figures. As shown in FIG. 3, memory 730 configures the processor 720 to implement one or more methods, steps, and functions (collectively, shown as process 780 in FIG. 3). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or FPGA rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method comprising:
background-sharing a one-time pad key from a first location to a second location over a secure background channel, wherein the background-sharing the one-time pad key includes determining, with first logic at the first location, that a first circular buffer at the first location is not full and, responsive to determining that the first circular buffer is not full, storing a predetermined number of bits from a random number generator at the first location in temporary storage at the first location and sending the predetermined number of bits from the random number generator to the second location over the secure background channel; and
sending a message, encrypted with the one-time pad key, from the first location to the second location, over an unsecure channel.

2. The method of claim 1, wherein, in the steps of background sharing the one-time pad key and sending the message, the secure background communications channel is slower than the unsecure channel.

3. The method of claim 2, wherein, in the step of background sharing the one-time pad key, the secure background communications channel comprises at least one of a secure shielded cable; a scheduled drone, scheduled unmanned ground vehicle, or scheduled unmanned marine vehicle carrying memory media; and free space optical communication.

4. The method of claim 2, wherein, in the step of sending the message, the unsecure channel comprises at least one of wired internet, wireless communications, and satellite.

5. The method of claim 2, wherein background-sharing the one-time pad key includes,
upon receiving an acknowledgement of receipt from the second location over the secure background channel, storing the predetermined number of bits from the random number generator in the first circular buffer.

6. The computer-implemented method of claim 2, further comprising decrypting the message at the second location using the one-time pad key.

7. The method of claim 6, wherein background-sharing the one-time pad key includes, upon receiving an acknowledgement of receipt from the second location over the secure background channel, storing the predetermined number of bits from the random number generator in the first circular buffer;
obtaining, at the second location, the predetermined number of bits from the random number generator at the first location over the secure background channel;
at the second location, sending the acknowledgement of receipt to the first location over the secure background channel; and
storing the predetermined number of bits from the random number generator at the first location in a second circular buffer at the second location.

8. The method of claim 7, further comprising encrypting the message by XOR-ing bits from a start of the first circular buffer with bits of the message.

9. The method of claim 8, wherein decrypting the message at the second location using the one-time pad key comprises decrypting the message by XOR-ing corresponding bits from a start of the second circular buffer with corresponding bits of the message.

10. The method of claim 8, further comprising:
compressing the message to obtain a compressed message, wherein in the step of sending the message, the compressed message is encrypted with the one-time pad key, and in the step of decrypting the message at the second location, the encrypted compressed message is decrypted; and
decompressing the decrypted compressed message.

11. A non-transitory computer readable medium comprising computer executable instructions which when executed by a computer cause the computer to perform the method of:
background-sharing a one-time pad key from a first location to a second location over a secure background channel, wherein the background-sharing the one-time pad key includes determining, with first logic at the first location, that a first circular buffer at the first location is not full and, responsive to determining that the first circular buffer is not full, storing a predetermined number of bits from a random number generator at the first location in temporary storage at the first location and sending the predetermined number of bits from the random number generator to the second location over the secure background channel; and
sending a message, encrypted with the one-time pad key, from the first location to the second location, over an unsecure channel.

12. A system comprising:
a first client comprising:
a first circular buffer;
a first temporary storage;
a random number generator;
a first memory; and
at least one first processor, implementing first logic and coupled to the first memory and the random number generator, and operative to:
background-share a one-time pad key from the first client to a second client over a secure background channel by determining, with the first logic, that the first circular buffer is not full and responsive to determining that the first circular buffer is not full: storing a predetermined number of bits from the random number generator in the first temporary storage and sending the predetermined number of bits from the random number generator to the second client over the secure background channel; and send a message, encrypted with the one-time pad key, from the first client to the second client, over an unsecure channel.

13. The system of claim 12, wherein upon receiving an acknowledgement of receipt from the second client over the secure background channel, storing the predetermined number of bits from the random number generator in the first circular buffer.

14. The system of claim 12, further comprising:

the second client; and a communications network that couples the first and second clients and implements the unsecure channel;

wherein the second client includes a second memory, and at least one second processor, coupled to the second memory, and operative to decrypt the message using the one-time pad key.

15. The system of claim 14, wherein:

the second client further comprises second temporary storage;

the at least one first processor background-shares the one-time pad key by, upon receiving an acknowledgement of receipt from the second client over the secure background channel, storing the predetermined number of bits from the random number generator in the first circular buffer; and the at least one second processor is operative to:

obtain the predetermined number of bits from the random number generator over the secure background channel;

send the acknowledgement of receipt to the first location over the secure background channel; and store the predetermined number of bits from the random number generator in the second circular buffer.

16. The system of claim 15, wherein the at least one first processor is operative to encrypt the message by XOR-ing bits from a start of the first circular buffer with bits of the message.

17. The system of claim 16, wherein the at least one second processor is operative to decrypt the message by XOR-ing corresponding bits from a start of the second circular buffer with corresponding bits of the message.

18. The system of claim 17, wherein:

the at least one first processor is operative to compress the message to obtain a compressed message, wherein the compressed message is encrypted with the one-time pad key; and the at least one second processor is operative to decrypting the encrypted compressed message and to decompress the decrypted compressed message.

19. The system of claim 14, wherein the secure background communications channel is slower than the unsecure channel implemented on the communications network.

20. The system of claim 19, further comprising at least one of a secure shielded cable; a scheduled drone, scheduled unmanned ground vehicle, or scheduled unmanned marine vehicle carrying memory media; and free space optical communication implementing the secure background communications channel between the first and second clients.

21. The system of claim 14, wherein the communications network that couples the first and second clients and implements the unsecure channel comprises at least one of wired internet, wireless communications, and satellite.

* * * * *